United States Patent
Cherkauer et al.

(10) Patent No.: US 6,631,446 B1
(45) Date of Patent: Oct. 7, 2003

(54) SELF-TUNING BUFFER MANAGEMENT

(75) Inventors: Kevin J. Cherkauer, Portland, OR (US); Roger C. Raphael, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 333 days.

(21) Appl. No.: 09/696,883

(22) Filed: Oct. 26, 2000

(51) Int. Cl.$^7$ .............................................. G06F 12/12
(52) U.S. Cl. ..................... 711/134; 711/133; 711/159
(58) Field of Search ................................. 711/133, 134, 711/173, 136, 159; 710/52, 56

(56) References Cited

U.S. PATENT DOCUMENTS

| | | | |
|---|---|---|---|
| 5,432,919 A | * 7/1995 | Falcone et al. | 711/134 |
| 5,584,015 A | * 12/1996 | Villette et al. | 711/173 |
| 5,640,604 A | * 6/1997 | Hirano | 710/56 |
| 5,680,573 A | 10/1997 | Rubin et al. | 711/118 |
| 5,778,442 A | 7/1998 | Ezzat et al. | 711/133 |
| 5,915,104 A | * 6/1999 | Miller | 710/310 |
| 6,003,101 A | * 12/1999 | Williams | 710/100 |
| 6,088,767 A | * 7/2000 | Dan et al. | 711/134 |
| 6,317,427 B1 | * 11/2001 | Augusta et al. | 710/52 |
| 6,378,043 B1 | * 4/2002 | Girkar et al. | 711/133 |
| 6,397,274 B1 | * 5/2002 | Miller | 710/56 |

OTHER PUBLICATIONS

Hallnor et al. A Fully Associative Software–Managed Cache Design, ISCA 2000, pp. 107–116.*

Riley et al., "The Design of Multimedia Object Support in DEC Rdb", Digital Technical Journal, vol. 5, No. 2, pp. 50–64, Spring 1993.

Ozden et al., "Buffer Replacement Algorithms for Multimedia Storage Systems", Proceedings of the International Conference on Multimedia Computing and Systems, pp. 172–180, Jun. 1996.

Scheuermann et al., "A case for delay–conscious caching of Web documents", Computer Networks and ISDN Systems, vol. 29, Nos. 8–13 (Sep. 1997), pp. 997–1005.

Bridge et al., "The Oracle Universal Server Buffer Manager", Proc. Of the $23^{rd}$ VLDB Conference (1997), pp. 590–593.

Chou et al., "An Evaluation of Buffer Management Strategies for Relational Database Systems", Relational Implementation Techniques, VLDB (1985), pp. 174–188.

"MS SQL Server 7.0 Storage Engine", http://www.microsoft.com/technet/SQL/Technote/sq17stor.asp, Oct. 5, 2000.

Chen et al., "Adaptive Database Buffer Allocation Using Query Feedback", 1993 VLDB., http://www.cs.umd.edu/~nick/papers/vldb93.ps.gz.

* cited by examiner

Primary Examiner—Matthew Kim
Assistant Examiner—Yamir Encarnación
(74) Attorney, Agent, or Firm—Michael Buchenhorner; Romualdas Strimaitis

(57) ABSTRACT

Techniques for managing memory buffers include maintaining a pool of buffers and assigning the buffers to buffer classes based on the frequency with which information stored in the buffers is accessed. Different algorithms can be used to manage buffers assigned to the different classes. A determination can be made as to whether a particular buffer qualifies for entry into a particular one of the buffer classes based on a comparison between a threshold value and the frequency with which information stored in the particular buffer was accessed during a specified time interval. Additionally, the threshold value can be adjusted dynamically to take account, for example, of the current load on the system.

28 Claims, 6 Drawing Sheets

SELF-TUNING BUFFER MANAGEMENT

BACKGROUND

The invention relates to self-tuning buffer management.

Computer systems have limited memory storage for the information they process, and in some cases, the amount of information to be processed may exceed the amount of available storage. Buffering systems, such as caches, allow only a subset of the information to be stored in memory at any given time. Information stored in the buffers typically can be retrieved more quickly than information stored, for example, on a magnetic or optical disk.

A buffer manager is responsible for managing the buffers. For example, to store new data in the cache when the cache is full, at least some data already residing in the cache must be replaced. Various replacement strategies are known including replacing the least recently used (LRU) data. In general, such strategies also involve rearranging the relative positions of the buffers within the pool. For example, one implementation of the LUR technique maintains the list of buffers according to the time at which the data in each buffer is accessed. At one end (the "hot" end) of the list is a buffer containing the most recently used data, and at the other end (the "cold" end) is a buffer containing the least recently used data. When data in a given buffer is accessed, the buffer containing the data is moved from its current location in the list to the hot end of the list. When new data is brought into the cache, it is placed in the buffer at the cold end of the list, and the buffer then is moved to the hot end of the list.

A considerable amount of overhead is required to rearrange the buffers each time data is accessed. This rearranging also can lead to contention for buffer data structures, limiting the amount of parallelism that can be achieved in the buffer manager. Reducing contention is an important way to enable a multi-CPU (central processing unit) system to run faster, so that the CPUs do not have to wait for each other as much. Therefore, it would desirable to improve management of the buffers.

SUMMARY

In general, a method of managing memory buffers includes maintaining a pool of buffers and assigning the buffers to buffer classes based on the frequency with which information stored in the buffers is accessed. Different algorithms can be used to manage buffers assigned to the different classes.

Various implementations can include one or more of the following features. A determination can be made as to whether a particular buffer qualifies for entry into a particular one of the buffer classes based on a comparison between a threshold value and the frequency with which information stored in the particular buffer was accessed during a specified time interval.

The threshold value can be adjusted dynamically. For example, if it is determined that too many buffers have qualified for entry into the particular buffer class, the threshold value can be increased. If it is determined that too few buffers have qualified for entry into the particular buffer class, the threshold value can be decreased. The particular buffer class can have a target size, and the threshold value can be adjusted based on the number of attempts to assign buffers to the particular buffer class that would cause the target size to be exceeded. In some cases, the target size represents a maximum permissible size for the particular buffer class. In general, the technique can include periodically checking the extent of any disparity between a target size for the particular buffer class and the number of buffers that qualified for the particular buffer class during a previous time interval and adjusting the threshold value based on the extent of the disparity.

In some situations, a user can designate particular information as a candidate for storage in a particular buffer class. The techniques then can include determining whether requested information was previously designated by a user as a candidate for storage in a particular buffer class and comparing the frequency with which the requested information was accessed during a specified time interval to a threshold value. If the requested information was previously designated by a user as a candidate for storage in the particular buffer class and the frequency with which the information was accessed during the specified time interval is greater than the threshold value, then the requested information is stored in a buffer in the particular buffer class.

A system that includes first and second memories, a bus and a processor configured to execute the foregoing techniques also is disclosed. Furthermore, an article that includes a computer-readable medium that stores computer-executable instructions for causing a computer system to execute the foregoing techniques is disclosed.

Some implementations include one or more of the following advantages. The techniques can allow buffers to be assigned to a buffer class based on how frequently the buffers are accessed. The techniques can help ensure that buffers that previously were accessed frequently but are no longer being accessed frequently are moved to lower priority classes. Thus, buffers can be prevented from becoming permanently labeled as containing frequently-accessed data when the data no longer is being accessed frequently.

Adjustments to the thresholds can be made dynamically to take account, for example, of the current load on the system. The adjustments can be implemented automatically by the system without user intervention and can increase the overall efficiency and cost-effectiveness of the system.

Other features and advantages will be readily apparent from the following detailed description, the accompanying drawings and the claims.

DETAILED DESCRIPTION

Figure 1:
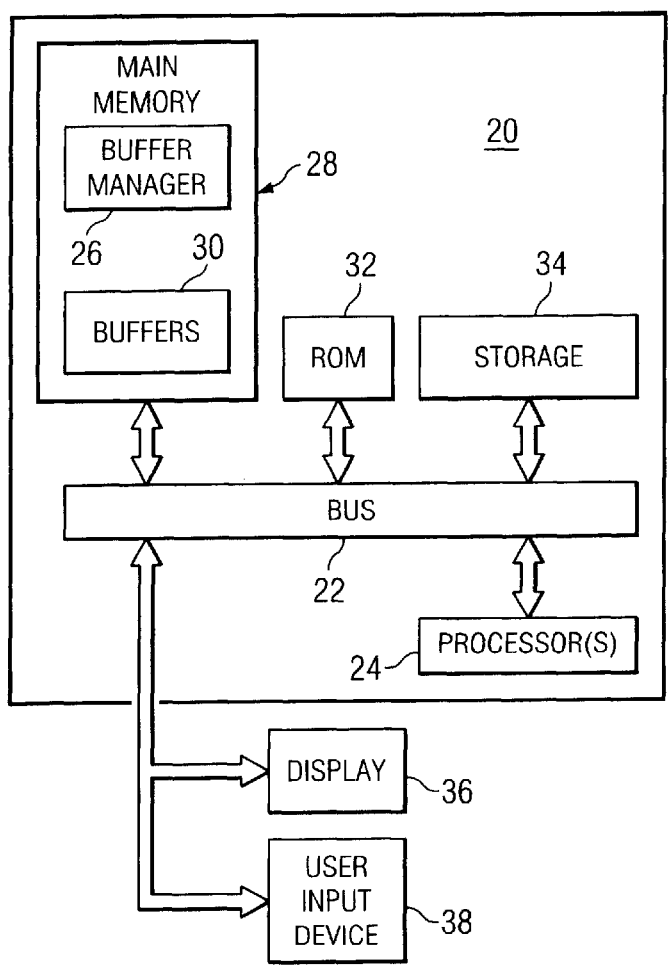
FIG. 1 is an exemplary computer system in which the invention can be implemented.

As shown in FIG. 1, a computer system 20 can buffer data that is accessed by one or more processors 24 while the computer system executes a program. As the computer system 20 executes the program, it maintains a pool of buffers 30 within a main memory 28. The main memory 28 can comprise random access memory (RAM) or other dynamic memory for storing information and instructions to be executed by the processor(s) 24. The main memory 28 also can be used to store temporary variable or other intermediate information during execution of the instructions by the processor(s) 24. The buffers 30 are managed by a buffer manager 26. The system 20 includes a bus 22 for communicating information between system components such as the processor(s) 24 and main memory 28. A read-only memory (ROM) or other static memory 32 is coupled to the bus and stores static information and instructions for the processor(s) 24. A data storage device 34, such as a magnetic disk or optical disk and its corresponding drive, also is coupled to the bus 22. The bus 22 can be coupled to a display device 36 to allow information to be displayed to a user. Similarly, one or more user input devices 38 can be coupled to the bus 22 to allow a user to interact with the system by entering information and making direction and/or command selections.

The system 20 may be used, for example, as a server for an operating system, a database or other computerized data retrieval system.

Figure 2:
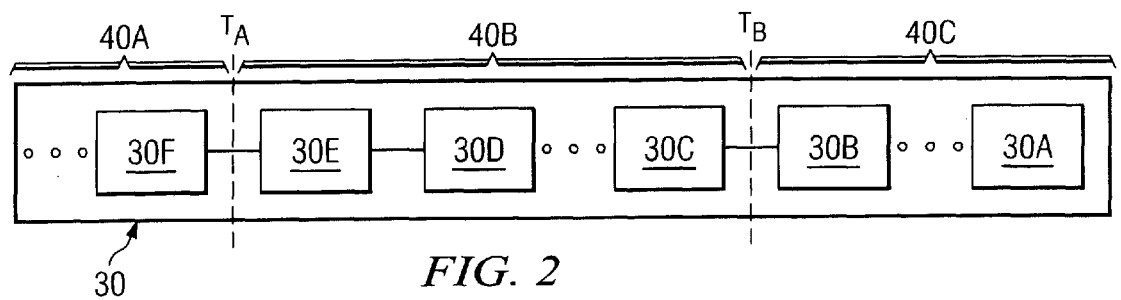
FIG. 2 illustrates an exemplary assignment of buffers to classes.

As illustrated in FIG. 2, the pool of buffers—including buffers 30A through 30F—can be divided into multiple classes with each class being managed by a different algorithm. The various algorithms fall along a performance-precision spectrum. For example, some buffer management algorithms are computationally inexpensive, but are coarse-grained, in other words, relatively imprecise with respect to the positioning of the buffers within the class. Other algorithms are more expensive, but are finer-grained, in other words, more precise with respect to the relative positioning of the buffers.

One implementation includes three classes of buffers 40A, 40B and 40C. The first class 40A includes buffers that store "memory resident" information, in other words, information that is very frequently accessed by the processor(s) 24. Because information stored in the first class 40A of buffers frequently is accessed and, therefore, is expected to remain in the main memory 28, a relatively inexpensive, coarse algorithm can be used to manage the first class of buffers. In other implementations, for example, where there is no need to maintain any information about the relative importance of the buffers within the class, the first class may have no internal management algorithm. The second class of buffers 40B contains "high priority" information that is somewhat less frequently accessed by the processor 24. To allow the buffer manager 26 to determine which information no longer needs to be considered high priority, a finer-grained algorithm can be used to manage the second class of buffers. In one implementation, a first-in-first-out (FIFO) algorithm can be used to manage the buffers 30 in the second class 40B. "Low priority" information can be stored in the third class 40C of buffers. Low priority information tends to enter and leave the main memory 28 frequently; in other words, the low priority information tends to be infrequently accessed by the processor(s) 24. Although the particular implementation discussed here includes three buffer classes, other implementations can include fewer or more than three buffer classes.

If all the buffers 28 currently are in use, when new information is read from the storage device 34, information stored in one of the low priority buffers is replaced with the new information. In general, the selection of which information should be replaced is likely to have a large impact on the overall performance of the computer system 20. Therefore, the third class 40C of buffers is managed by an even finer-grained algorithm. In one implementation, a least recently used (LRU) algorithm is used to manage the buffers 30 in the third class 40C. Although the particular implementation described above uses three classes of buffers, the techniques described here can be used in any system that uses two or more buffer classes each of which may be managed by a different algorithm. Various algorithms can be used to manage the buffers in a particular class and, therefore, the details of particular algorithms are not discussed further.

In general, each class 40A, 40B of buffers (other than the lowest priority class 40C) has a target size that can be set by an administrator or other user of the system 20. In one implementation, the target sizes represent maximum sizes of the respective buffer classes. The maximum sizes of the classes can be the same, although they may be different. The maximum sizes are designed by $S_A$ and $S_B$ corresponding to the classes 40A and 40B, respectively. In the present implementation, the size of the lowest priority class 40C is limited only by the total number of buffers 30.

Assignment of a particular buffer to a specific one of the buffer classes depends on the frequency with which the information stored in that buffer is accessed compared to previously-established variable threshold frequencies for the classes (other than the lowest priority class 40C). The thresholds are designed by $T_A$ and $T_B$ corresponding to the classes 40A and 40B, respectively. The threshold for each higher-priority class is set to be higher than the threshold of lower-priority classes. In other words, the thresholds monotonically decrease from the "memory resident" class 40A to the high priority class 40B, with $T_A > T_B$. Thus, buffers that are more frequently accessed will be assigned to a higher priority class that can be managed by less expensive algorithms.

As shown in FIG. 2, the buffers 30A and 30B are members of the low priority class 40C. Buffers 30C, 30D and 30E are members of the high priority class 40B, and buffer 30F is a member of the memory resident class 40A. The main memory 28 stores an identification of the class with which each buffer currently is associated and, if relevant for that class, the position of the buffer within the class. The main memory 28 also stores an "access count" for each buffer, in other words, the number of times that the information in the buffer has been accessed during a previous time interval.

Figure 3:
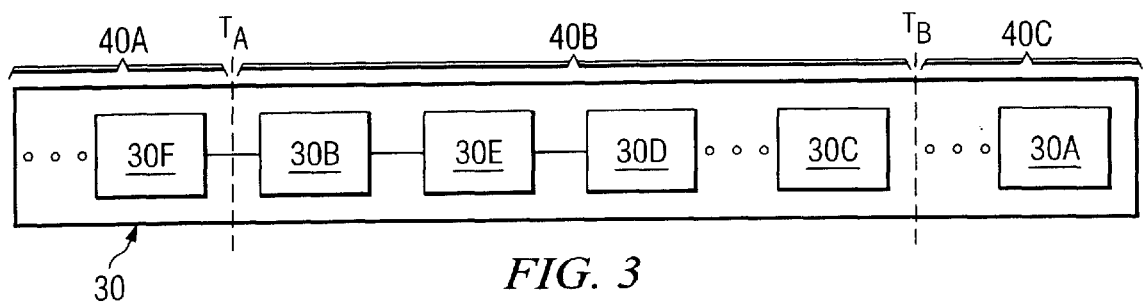
FIG. 3 illustrates an assignment of buffers to the classes at a subsequent time.

During operation of the system, the processor(s) 24 may access information in the buffers 30 and/or in the storage device 34. As a result, the order of the buffers may be changed and/or some buffers may become members of a different class to reflect the frequency with which the information stored in each buffer is being accessed. For example, assuming that during the next relevant time interval the information stored in the buffer 30B is accessed more frequently than the threshold frequency $T_B$, the buffer 30B would be reassigned as a member of the class 40B, as illustrated in FIG. 3.

Figure 4A:
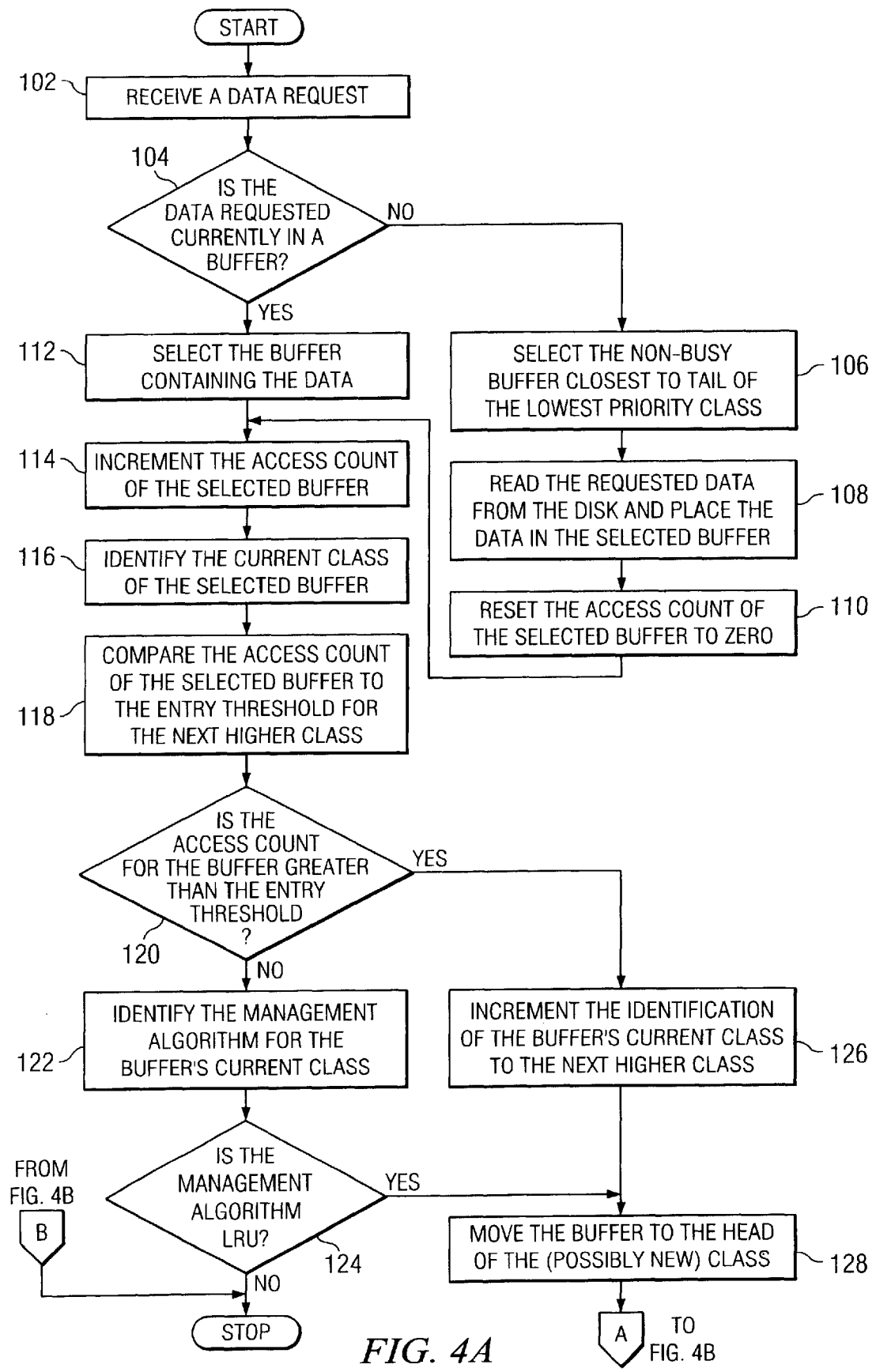
FIGS. 4A and 4B are a flow chart of a method for allocating the buffers to the classes.
Figure 4B:
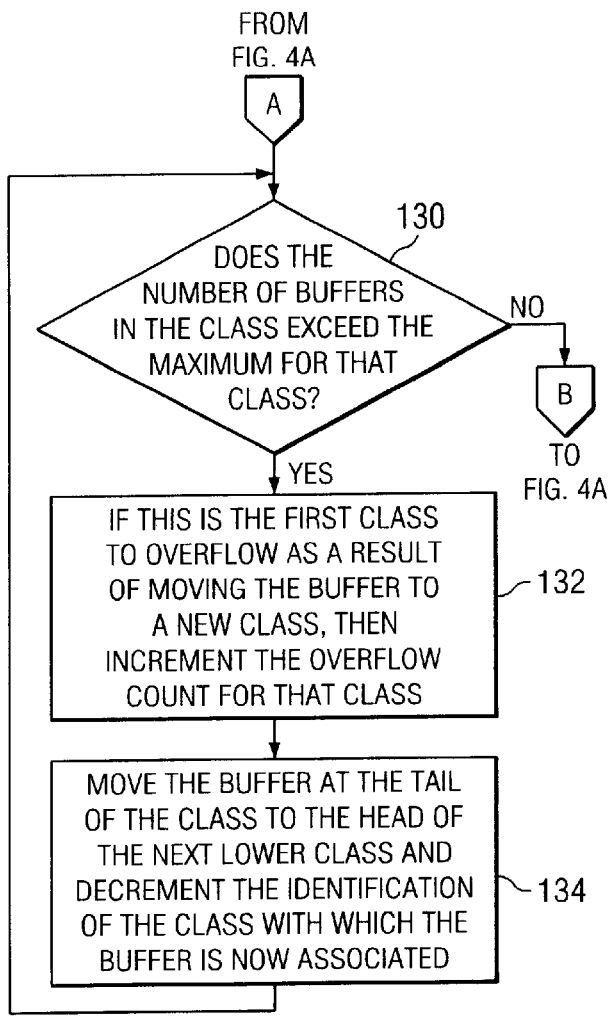

FIGS. 4A and 4B illustrate one implementation for allocating buffers to the buffer classes based on the frequency with which the buffers are accessed. As indicated by block 102, a data request is received by the system 20. The processor 24 determines 104 whether the requested data is currently in one of the buffers 30. If the requested data is not currently in one of the buffers 30, then the processor 24 selects 106 the non-busy buffer closest to the tail of the lowest priority class 40C. For example, with reference to FIG. 2, the buffer 30A would be selected. The requested data is read from the magnetic disk or other storage device 34 and is placed 108 in the selected buffer. The access count of the selected buffer 30A is reset 110 to zero and then is incremented 114 by one. The process continues with block 116 discussed below.

If the date requested in block 104 is currently in one of the buffers 30, then the processor 24 selects 112 the buffer containing the data, and the access count of the selected buffer is incremented 114 by one.

Next, the current class of the selected buffer is identified 116, and the access count of the selected buffer is compared 118 to the entry threshold for next higher class. For example, if the selected buffer were currently in class 40C, the buffer's access count would be compared to the threshold $T_B$. Similarly, if the selected buffer were currently in class 40B, the buffer's access count would be compared to the threshold $T_A$. The buffer manager 26 determines 120 whether the access count for the selected buffer is greater than the entry threshold.

If the access count is not greater than the threshold for entry into the next higher buffer class, the management algorithm for the buffer's current class is identified 122, and it is determined 124 whether the algorithm used is a LRU technique. If the algorithm does not a LRU technique, then the process stops and waits for receipt of another data request. On the other hand, if the buffer class is being managed by a LRU technique, then the selected buffer is moved 128 to the head of the buffer class.

If (at block 120) the access count for the selected buffer is greater than the threshold for entry into the next class, then the identification of the buffer's class is incremented 126 to the next higher class and the buffer is moved 128 to the head of the new class (see FIGS. 2 and 3).

Next, the processor 24 determines 130 whether the number of buffers 30 in the class currently associated with the selected buffer exceeds the maximum size (e.g., $S_A$ or $S_B$) of that class. If the maximum size of the class is not exceeded, then the process stops and the processor 24 waits for receipt of another request for data. On the other hand, if the maximum size of the class is exceeded, then an overflow count associated with that class is incremented 132 by one, and the buffer at the tail of the class is moved 134 to the head of the next lower class. The identification of the class associated with the buffer that is moved in 134 is decremented by one.

Figure 5:
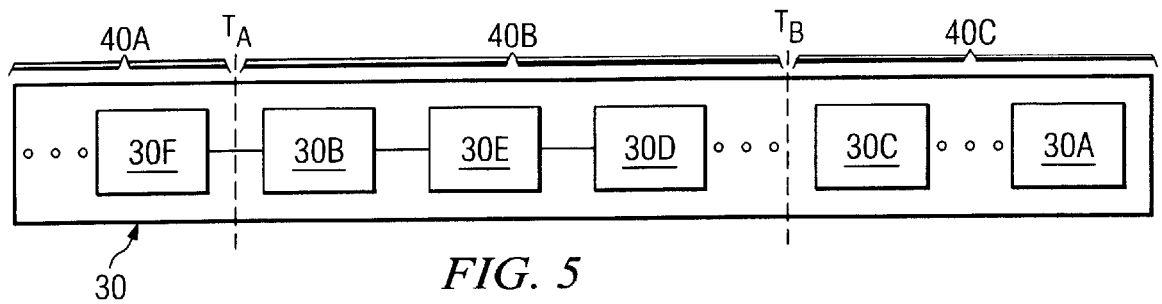
FIG. 5 illustrates reassignment of a buffer when a class exceeds it size limit.

To illustrate, assume, for example, that as a result of a request to access the data stored in the buffer 30B, the access count of that buffer is greater than the threshold $T_B$ so that the buffer is moved from the low priority class 40C to the higher priority class 40B, as shown in FIGS. 2 and 3. Assume further that moving the buffer 30B into the class 40B causes the number of buffers in that class to exceed the permissible size $S_B$. In that case, an overflow count associated with the class 40B is incremented, and the buffer 30C at the tail of the class 40B is moved to the head of the low priority class 40C as shown in FIG. 5.

In some cases, moving a buffer from a class that overflowed to the next lower priority class may cause the next lower priority class to exceed its maximum allowable size as well. Therefore, the cycle of checking whether the new class is overflowed and, if necessary, moving a buffer to another lower priority class (blocks 130, 132, 134) is repeated until no class exceeds its allowable size. In such situations, the overflow counts for the lower priority classes are not incremented in block 132. In other words, only the overflow count for the buffer class that initially overflowed is incremented.

Figure 6:
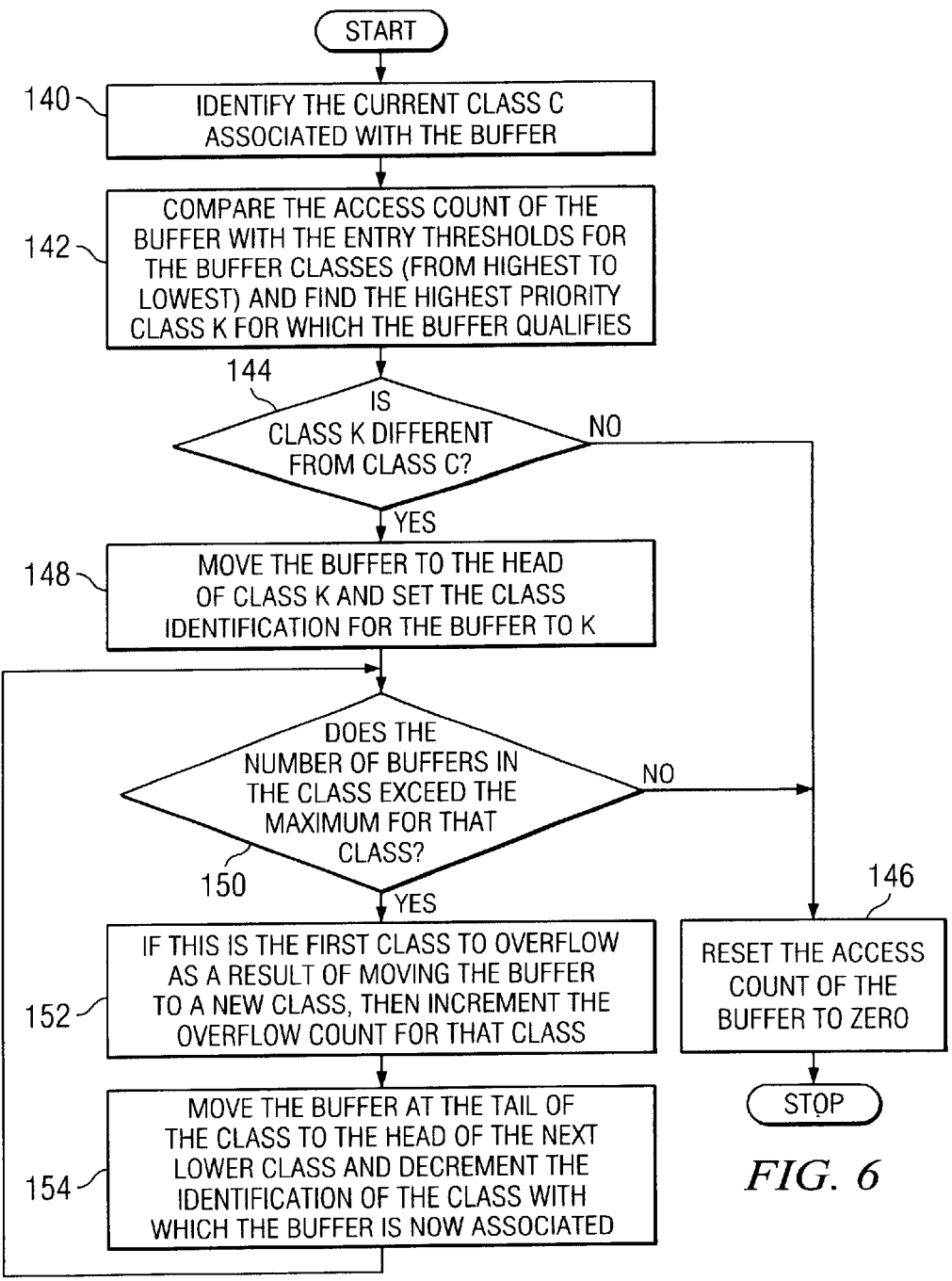
FIG. 6 is a flow chart of a method for periodically resetting buffer access counts.

Periodically, a routine is performed to ensure that each buffer is placed in the highest class for which it qualifies, to ensure that no buffer is a member of a class for which it no longer qualities, and to reset the access counts for the buffers. Periodically resetting the access counts effectively converts the access counts into frequencies, in other words, an indication of the number of times data in each buffer is accessed over a specified time interval. FIG. 6 illustrates an exemplary routine that can be performed periodically for each buffer.

As indicated by FIG. 6, the processor identifies 140 the current class (C) associated with a particular buffer. The access count for the buffer is compared 142 to the entry thresholds (e.g., $T_A$, $T_B$) for the buffer classes, starting with the class having the highest threshold. The highest priority class (K) for which the buffer qualifies is identified based on the comparison.

Next, a determination is made 144 as to whether the highest class (K) for which the buffer qualities is the same as or different from the class (C) with which the buffer currently is associated. If the classes identified by C and K are the same, then the buffer currently is associated with the correct class and no rearrangement of the buffers is required. The access count associated with the buffer is reset 146 to zero.

If, however, the classes identified by C and K are different, the buffer is moved 148 to the head of the highest class (K) for which it qualifies. The class identification associated with the buffer is set to the class K. The processor 24 then determines 150 whether the number of buffers 30 in the class (K) currently associated with the buffer exceeds the maximum size of that class. If the maximum size of the class (K) is not exceeded, then the access count associated with the buffer is reset 146 to zero. On the other hand, if the maximum size of the class is exceeded, then an overflow count associated with that class is incremented 152 by one, and the buffer at the tail of the class (K) is moved 154 to the head of the next lower class (K-1). The identification of the class associated with the buffer transferred to the class (K-1) is decremented by one.

As previously noted, moving a buffer from a class that overflowed to the next lower priority class may cause the next lower priority class to exceed its maximum allowable size as well. Therefore, the cycle of checking whether the new class is overflowed and, if necessary, moving a buffer to another lower priority class (blocks 150, 152, 154) is repeated until no class exceeds its allowable size. In such situations, only the overflow count for the buffer class that initially overflowed is incremented.

The foregoing techniques allow buffers to be assigned to a buffer class based on how frequently the buffers are accessed. The techniques also can help obviate the problem of overflow when the number of buffers in a particular class exceeds the maximum size of the buffer. Keeping track of the number of times each class overflows can be used, as discussed below, to adjust the entry thresholds $T_A$, $T_B$. In addition, by periodically resetting the access counts of the buffers, the techniques can help ensure that buffers that previously were accessed frequently but are no longer being accessed frequently are moved to lower priority classes. If such buffers continue to be accessed only infrequently, the data they contain can be replaced by new data from the storage device 34. Therefore, the buffers can be prevented from becoming permanently labeled as containing frequently-accessed data when the data no longer is being accessed frequently.

As operation of the system 20 continues, the number of buffers which qualify for a particular one of the classes 40A, 40B may exceed the previously established maximum sizes $S_A$, $S_B$. Alternatively, the number of buffers in one or more of the higher priority classes 40A, 40B may be well below the previously established maximum sizes $S_A$, $S_B$. Both situations are undesirable because they result either in overuse or insufficient use of the higher priority buffer classes.

Figure 7:
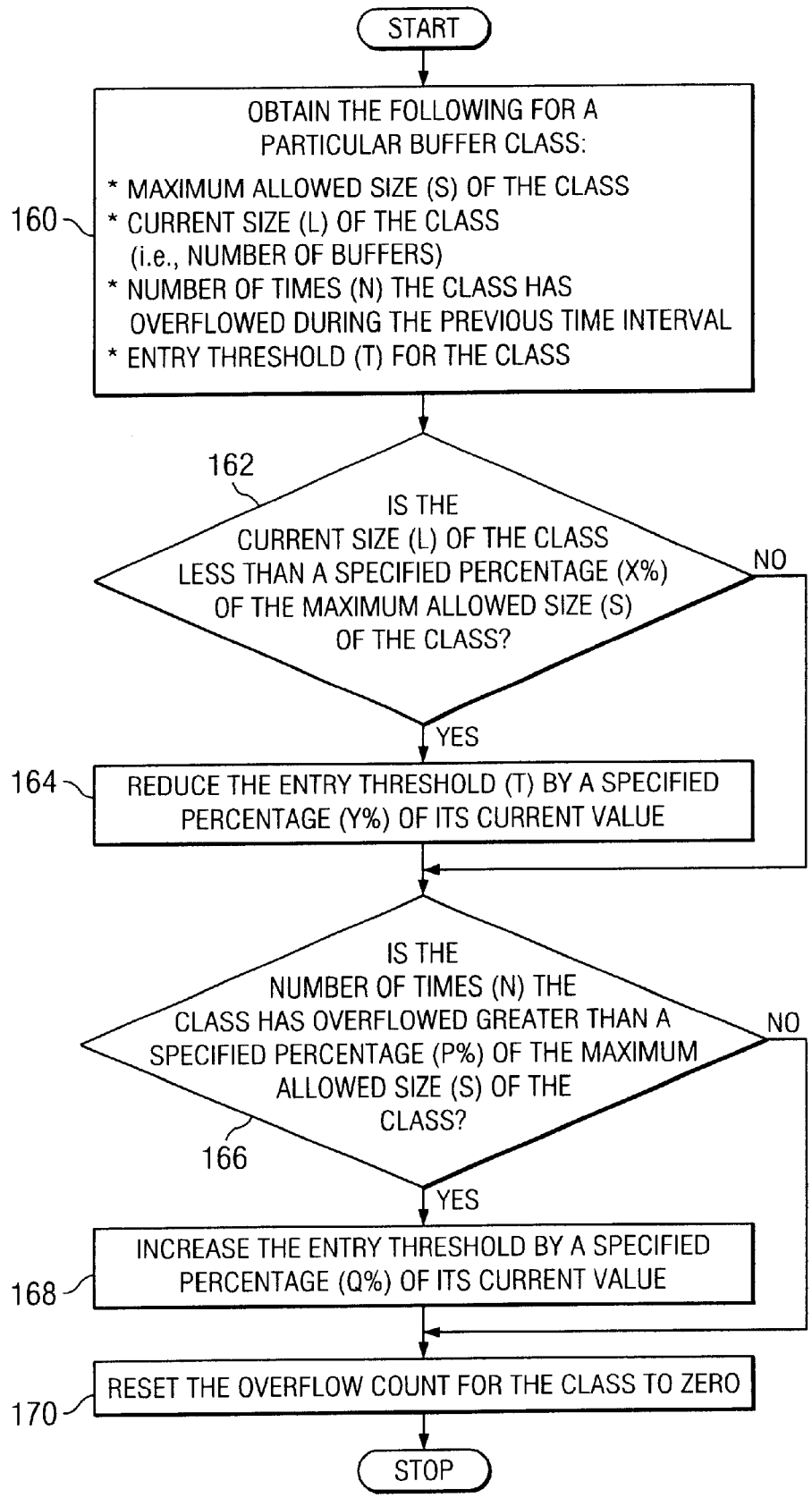
FIG. 7 is a flow chart of a method of adjusting threshold values for entry into the buffer classes.

To obviate disparities that arise between the actual number of buffers in the higher priority classes 40A, 40B and the maximum sizes $S_A$, $S_B$, a software routine is executed periodically by the buffer manager 26 to determine whether adjustments should be made to the thresholds $T_A$, $T_B$ for entry into the buffer classes. Adjustments to the thresholds can be made dynamically and can be implemented automatically by the system 20 without user intervention. FIG. 7 illustrates an exemplary technique for adjusting the threshold of a particular buffer class. The technique can be applied periodically to each of the buffer classes that has an entry threshold associated with it.

Figure 8:
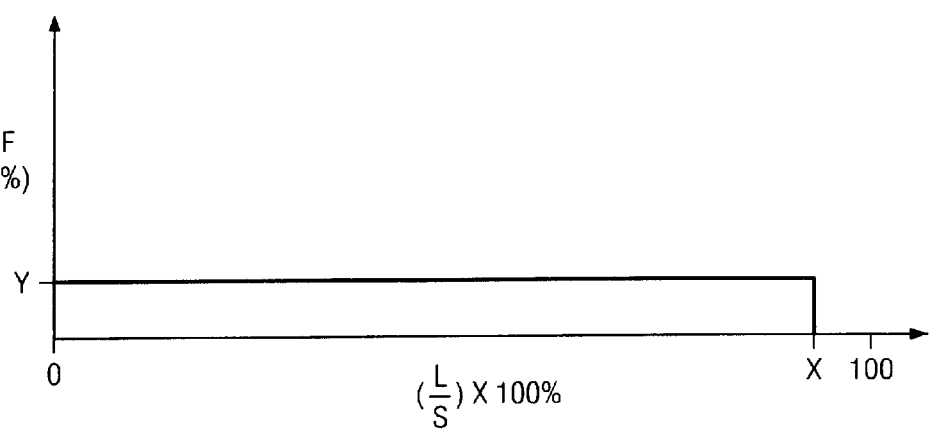
FIGS. 8 through 11 are graphs illustrating exemplary adjustments to the threshold values.

As shown in FIG. 7, the buffer management 26 obtains 160 the following information for the particular class under consideration: the maximum size (S) of the class; the current size (L) of the class; the number of times (N) the class has overflowed during the previous time interval; and the entry threshold (T) for the class. A determination is made 162 as to whether the current size (L) of the class, in other words, the number of buffers currently in the class, is less than a specified percentage (X%) of the maximum allowed size (S). The specified percentage (X%) represents a variable that can be established, for example, by a system administrator or other user. In one implementation, the specified percentage (X%) is set to ninety percent. However, in other implementations, the specified percentage (X%) can be set to smaller or larger percentages. The determination in block 162 is used to check whether the particular class is being underused. If the determination is affirmative, then the entry threshold (T) for the particular class is reduced 164 by a specified percentage (Y%) as illustrated by FIG. 8. The specified percentage (Y%) also represents a variable that can be established, for example, by a system administrator or other user. In one implementation, the specified percentage (Y%) is ten percent. However, in other implementations, the specified percentage (Y%) can be set to smaller or larger percentages. Decreasing the threshold (T) for a particular buffer class tends to make more buffers qualify for entry into the class. The adjustment to the threshold (T) can help prevent underuse of the particular class and helps increase the number of buffers that can be managed, for example, by a less expensive algorithm.

Figure 9:
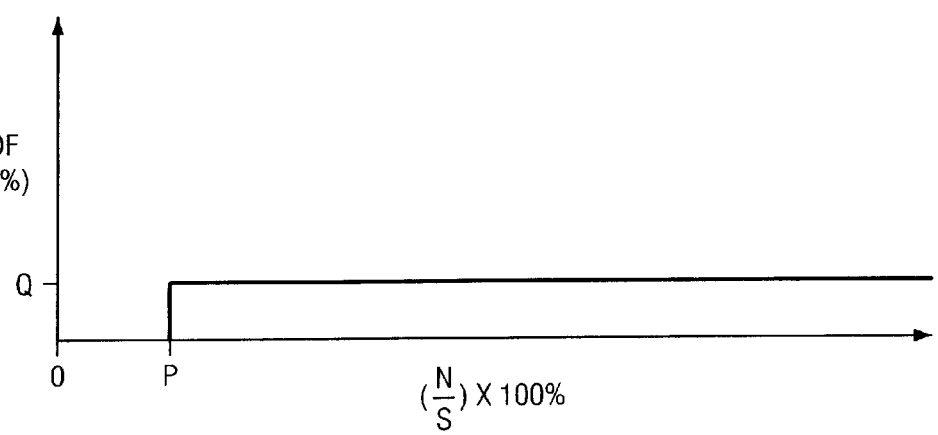

The management algorithm 26 also determines 166 whether the number of times (N) that the class has overflowed is greater than a specified percentage (P%) of the maximum allowed size (S) of the class. The specified percentage (P%) represents a variable that can be established, for example, by a system administrator or other user. In one implementation, the specified percentage (P%) is set to ten percent. However, in other implementations, the specified percentage (P%) can be set to smaller or larger percentages. The determination in block 166 is used to check whether the particular class is being overused. If the determination is affirmative, then the entry threshold (T) for the particular class is increased 168 by a specified percentage (Q%) as illustrated by FIG. 9. The specified percentage (Q%) also is a variable that can be established, for example, by a system administrator or other user. In one implementation, the specified percentage (Q%) is ten percent. However, in other implementations, the specified percentage (Q%) can be set to smaller or larger percentages. Increasing the threshold (T) for a particular buffer class tends to make fewer buffers qualify for entry into the class. The adjustment to the threshold (T) can help prevent overuse of the particular class.

After performing any adjustments to the threshold value (if required), the overflow count for the particular class is reset 170 to zero and the next time interval begins. The forgoing technique is repeated at the end of the next time interval.

Periodic checks and adjustments to the thresholds for entry into higher priority buffer classes can provide self-tuning buffer management for multiple classes. Assignment of the buffers to the classes automatically can be matched to the load on the system 20. Therefore, the buffer manager 26 can optimize its performance during heavy peak daytime workloads as well as light nighttime or weekend loads.

Figure 10:
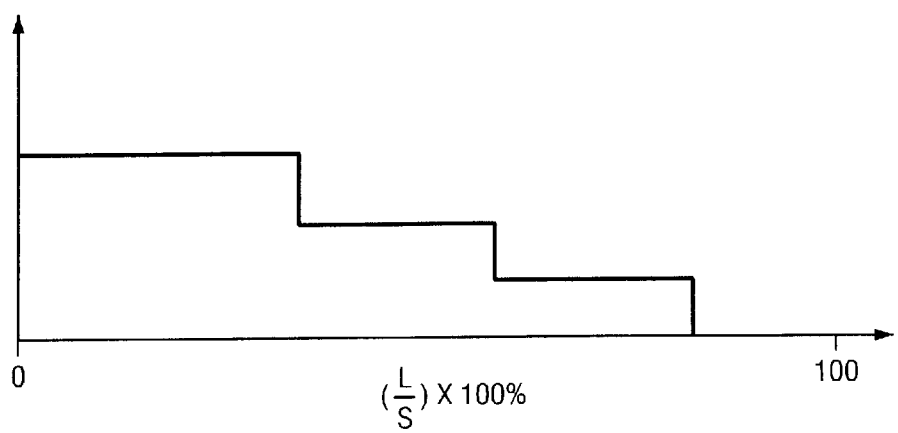
Figure 11:
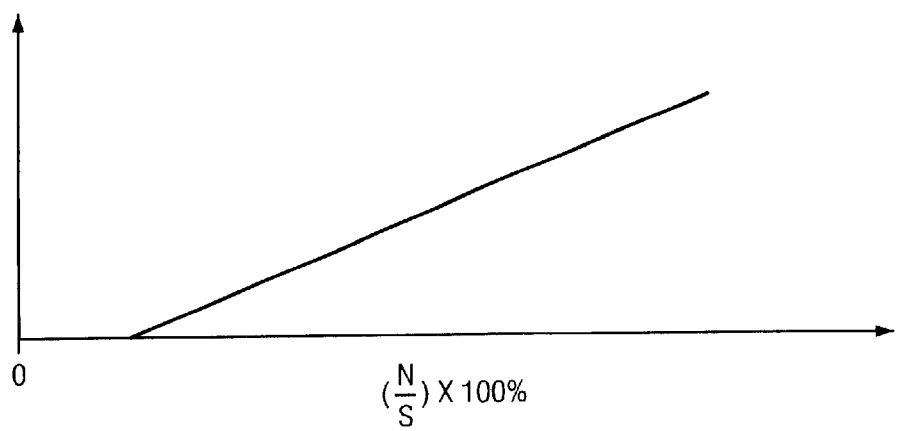

The amount of adjustment (Y% or P%) to the threshold in block 164 and block 168 need not be the same. Similarly, the values of the variable P, Q, X and Y can differ from one buffer class to the next. Furthermore, the amount of adjustment can vary with the degree of underuse or overuse of the particular buffer class. In other words, the amount of adjustment to the threshold value can be a function of the value of L (the current size of the class) or N (the number of times the class overflowed during the previous interval). For example, in one implementation, the downward adjustment to the threshold value would increase the discrepancy between the current size (L) and the maximum size (S) of the class increases, as illustrated by FIG. 10. Similarly, the upward adjustment to the threshold value would increase as the number of overflows (N) for the class during the previous time interval increased, as illustrated by FIG. 11. In other implementations, the upward and downward adjustments to the threshold value for a particular class can depend on N and S according to functions other than those illustrated in FIGS. 8 through 11.

Preferably, an additional constraint is placed on the permissible upward and downward adjustments to the threshold values for entry into the buffer classes. In general, the threshold value for a particular class should be lower than the threshold values for all higher priority classes.

Figure 12:
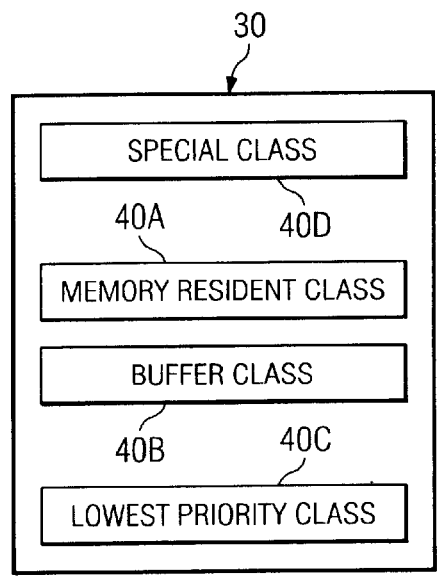
FIG. 12 illustrates exemplary buffer classes.

According to another implementation, users of the system 20 can designate specific data entries in the storage device 34 as candidates for storage in a special buffer class 40D (FIG. 12). The user can designate selected data entries, for example, by using the input device 38. The special buffer class 40D has a maximum size $S_D$ and is managed by an algorithm that may differ from the algorithms used to manage each of the other buffer classes 40A, 40B, 40C.

A modified version of the routine of FIG. 6 can be used to determine which buffers qualify for inclusion in the special class 40D. In particular, the class 40D is limited to buffers that contain data previously designated by the user as a candidate for storage in the special class. Furthermore, if a particular buffer qualifies for inclusion in the special class 40D as well as another one of the classes 40A, 40B, 40C, the buffer should be stored in the special class, as long as the maximum size $S_D$ of the class is not exceeded.

To make efficient use of the special class 40D, the special class is assigned a variable threshold value $T_D$. Although, in general, the threshold value associated with a particular class is greater than the thresholds of all lower priority classes, the requirement need not apply to the special class 40D. The routine of FIG. 7 can be used to adjust the threshold value $T_D$ automatically in the upward or downward direction. That routine, thus, can help ensure that an optimal number of the most frequently accessed buffers that qualify for inclusion in the special class 40D actually are assigned to the special class. In other words, if too many buffers qualify for inclusion in the special class 40D, the threshold $T_D$ is automatically adjusted upward, thereby increasing the likelihood that fewer buffers 30 will qualify for inclusion in the special class during a subsequent iteration of the routine of FIG. 6. Similarly, if too few buffers qualify for inclusion in the special class 40D, the threshold $T_D$ is automatically adjusted downward, thereby increasing the likelihood that more buffers 30 will qualify for inclusion in the special class during a subsequent iteration of the routine of FIG. 6. If too few buffers qualify for inclusion in the special class 40D, the threshold $T_D$ should be adjusted downward only if there is at least one buffer currently contains data previously designated by the user as a candidate for inclusion in the special class. That can help prevent unnecessary reduction of the threshold. In other words, if reducing the threshold $T_D$ for the special class 40D to a very small value will not immediately make any other buffers eligible for inclusion in the special class, then the threshold should not be reduced. The foregoing technique can provide a relatively quick and efficient way to approximate the most frequently accessed buffers that contain data designated by the user as a candidate for inclusion in the special buffer class.

Various features of the system 20 can be implemented in hardware, software, or a combination of hardware and software. For example, some aspects of the system can be implemented in computer programs executing on programmable computers. Each program can be implemented in a high level procedural or object-oriented programming language. Furthermore, each such computer program can be stored on a storage medium, such as reach-only-memory (ROM) readable by a general or special purpose programmable computer, for configuring and operating the computer when the storage medium is read by the computer to perform the functions described above.

Other implementations are within the scope of the claims. What is claimed is:

1. A method of managing memory buffers comprising:
   maintaining a pool of buffers;
   assigning the buffers to buffer classes based on a comparison between a threshold value and the frequency with which information stored in the particular buffer was accessed during a specified time interval; and
   adjusting the threshold value;
   wherein the particular one of the buffer classes has a target size, and wherein the method includes adjusting the threshold value based on the number of attempts to assign buffers to the particular buffer class that would cause the target size to be exceeded.

2. The method of claim 1 wherein the target size represents a maximum permissible size for the particular buffer class.

3. The method of claim 1 including dynamically adjusting the threshold value.

4. The method of claim 3 including increasing the threshold value if it is determined that too many buffers have qualified for entry into the particular buffer class.

5. The method of claim 3 including decreasing the threshold value if it is determined that too few buffers have qualified for entry into the particular buffer class.

6. A method of managing memory buffers comprising:
   maintaining a pool of buffers;
   assigning the buffers to buffer classes based on a comparison between a threshold value and the frequency with which information stored in the particular buffer was accessing during a specified time interval;
   dynamically adjusting the threshold value when the number of buffers that qualify, during a specified time interval, for entry into a buffer class associated with the threshold value differs from a target size of the class by at least a specified amount.

7. A method of managing memory buffers comprising:
   maintaining a pool of buffers;
   assigning the buffers to buffer classes based on a comparison between a threshold value and the frequency with which information stored in the particular buffer was accessed during a specified time interval;
   adjusting the threshold value;
   periodically checking the extent of any disparity between a target size for the particular buffer class and the number of buffers that qualified for the particular buffer class during a previous time interval; and
   adjusting the threshold value based on the extent of the disparity.

8. The method of claim 7 wherein different algorithms are used to manage buffers assigned to the different classes.

9. The method of claim 8 wherein there are at least three buffer classes.

10. The method of claim 9, wherein at least one of the classes has a respective threshold value associated with it and a respective target size, and wherein the method includes:
    determining whether a particular buffer qualifies for entry into a particular one of the buffer classes based on a comparison between the threshold value for that buffer class and the frequency with which information stored in the particular buffer was accessed during a specified time interval; and
    dynamically adjusting the threshold value of the particular buffer class.

11. The method of claim 7 including:
    determining whether requested information was previously designated by a user as a candidate for storage in a particular buffer class;
    comparing a frequency with which the requested information was accessed during a specified time interval to a threshold value; and
    storing the requested information in a buffer in the particular buffer class if the requested information was previously designated by a user as a candidate for storage in the particular buffer class and if the frequency with which the information was accessed during the specified time interval is greater than the threshold value.

12. A computer system comprising:
    a first memory comprising a pool of buffers and a second memory;
    a bus;
    a processor configured to access information from the first and second memories over the bus and to manage what information is stored in the buffers and to assign the buffers to buffer classes based on a frequency with which information stored in the buffers is accessed, wherein the buffer classes are managed by different algorithms;

wherein the information stored in the first memory can be accessed by the processor more quickly than information stored in the second memory;

wherein the particular one of the buffer classes has a target size, and wherein the processor is configured to adjust the threshold based on the number of attempts to assign buffers to the particular buffer class that would cause the target size to be exceeded.

13. The system of claim 12 wherein the target size represents a maximum permissible size for the particular buffer class.

14. The system of claim 12 wherein the processor is configured to increase the threshold value if it determined that too many buffers have qualified for entry into the particular buffer class.

15. The system of claim 12 wherein the processor is configured to decrease the threshold value if it determined that too few buffers have qualified for entry into the particular buffer class.

16. A computer system comprising:

a first memory comprising a pool of buffers and a second memory;

a bus;

a processor configured to access information from the first and second memories over the bus and to manage what information is stored in the buffers and to assign the buffers to buffer classes based on a frequency with which information stored in the buffers is accessed, wherein the buffer classes are managed by different algorithms;

wherein the information stored in the first memory can be accessed by the processor more quickly than information stored in the second memory; and wherein the processor is configured to check periodically the extent of any disparity between a target size for the particular buffer class and the number of buffers that qualified for the particular buffer class during a previous time interval and to adjust the threshold value based on the extent of the disparity.

17. The system of claim 16 wherein there are at least three buffer classes and wherein at least one of the classes has a respective threshold value associated with it and a respective target size.

18. The system of claim 16 including a user input device, wherein the processor is configured to determine whether requested information was previously designated by a user as a candidate for storage in a particular buffer class, to compare a frequency with which the requested information was accessed during a specified time interval to a threshold value, and to store the requested information in a buffer in the particular buffer class if the requested information was previously designated by a user as a candidate for storage in the particular buffer class and if the frequency with which the information was accessed during the specified time interval is greater than the threshold value.

19. An article comprising a computer-readable medium that stores computer-executable instructions for causing a computer system to:

maintain a pool of memory buffers; and assign the buffers to buffer classes based on a frequency with which information stored in the buffers is accessed;

causing the computer system to determine whether a particular buffer qualifies for entry into a particular one of the buffer classes based on a comparison between a threshold value and the frequency with which information stored in the particular buffer was accessed during a specified time interval; and causing the computer system to adjust the threshold value;

wherein the particular one of the buffer classes has a target size, and wherein the medium includes instructions for causing the computer system to adjust the threshold based on the number of attempts to assign buffers to the particular buffer class that would cause the target size to be exceeded.

20. The article of claim 19 wherein the target size represents a maximum permissible size for the particular buffer class.

21. An article comprising a computer-readable medium that stores computer-executable instructions for causing a computer system to:

maintain a pool of memory buffers; and assign the buffers to buffer classes based on a frequency with which information stored in the buffers is accessed;

causing the computer system to determine whether a particular buffer qualifies for entry into a particular one of the buffer classes based on a comparison between a threshold value and the frequency with which information stored in the particular buffer was accessed during a specified time interval; and causing the computer system to adjust the threshold value dynamically when the number of buffers that qualify, during a specified time interval, for entry into a buffer class associated with the threshold value differs from a target size of the class by at least a specified amount.

22. An article comprising a computer-readable medium that stores computer-executable instructions for causing a computer system to:

maintain a pool of memory buffers; and assign the buffers to buffer classes based on a frequency with which information stored in the buffers is accessed;

causing the computer system to determine whether a particular buffer qualifies for entry into a particular one of the buffer classes based on a comparison between a threshold value and the frequency with which information stored in the particular buffer was accessed during a specified time interval; and causing the computer system periodically to check the extent of any disparity between a target size for the particular buffer class and the number of buffers that qualified for the particular buffer class during a previous time interval and to adjust the threshold value based on the extent of the disparity.

23. The article of claim 22 including instructions for causing the computer system to adjust the threshold value dynamically.

24. The article of claim 23 including instructions for causing the computer system to increase the threshold value if it determined that too many buffers have qualified for entry into the particular buffer class.

25. The article of claim 23 including instructions for causing the computer system to decrease the threshold value if it determined that too few buffers have qualified for entry into the particular buffer class.

26. The article of claim 22 comprising instructions for managing buffers assigned to the different classes using different algorithms.

27. The article of claim 22 including instructions for causing the computer system to:

determine whether requested information was previously designated by a user as a candidate for storage in a particular buffer class;

compare a frequency with which the requested information was accessed during a specified time interval to a threshold value; and store the requested information in a buffer in the particular buffer class if the requested information was previously designated by a user as a candidate for storage in the particular buffer class and if the frequency with which the information was accessed during the specified time interval is greater than the threshold value.

28. A method of managing memory buffers comprising:

maintaining a pool of buffers;

assigning the buffers to buffer classes based on a comparison between a threshold value and the frequency with which information stored in the particular buffer was accessed during a specified time interval; and adjusting the threshold value;

wherein the particular one of the buffer classes has a target size.

* * * * *